May 25, 1937.  J. W. RACKLYEFT  2,081,838
CLUTCH AND CONTROL MECHANISM THEREFOR
Filed Feb. 18, 1935   3 Sheets-Sheet 3

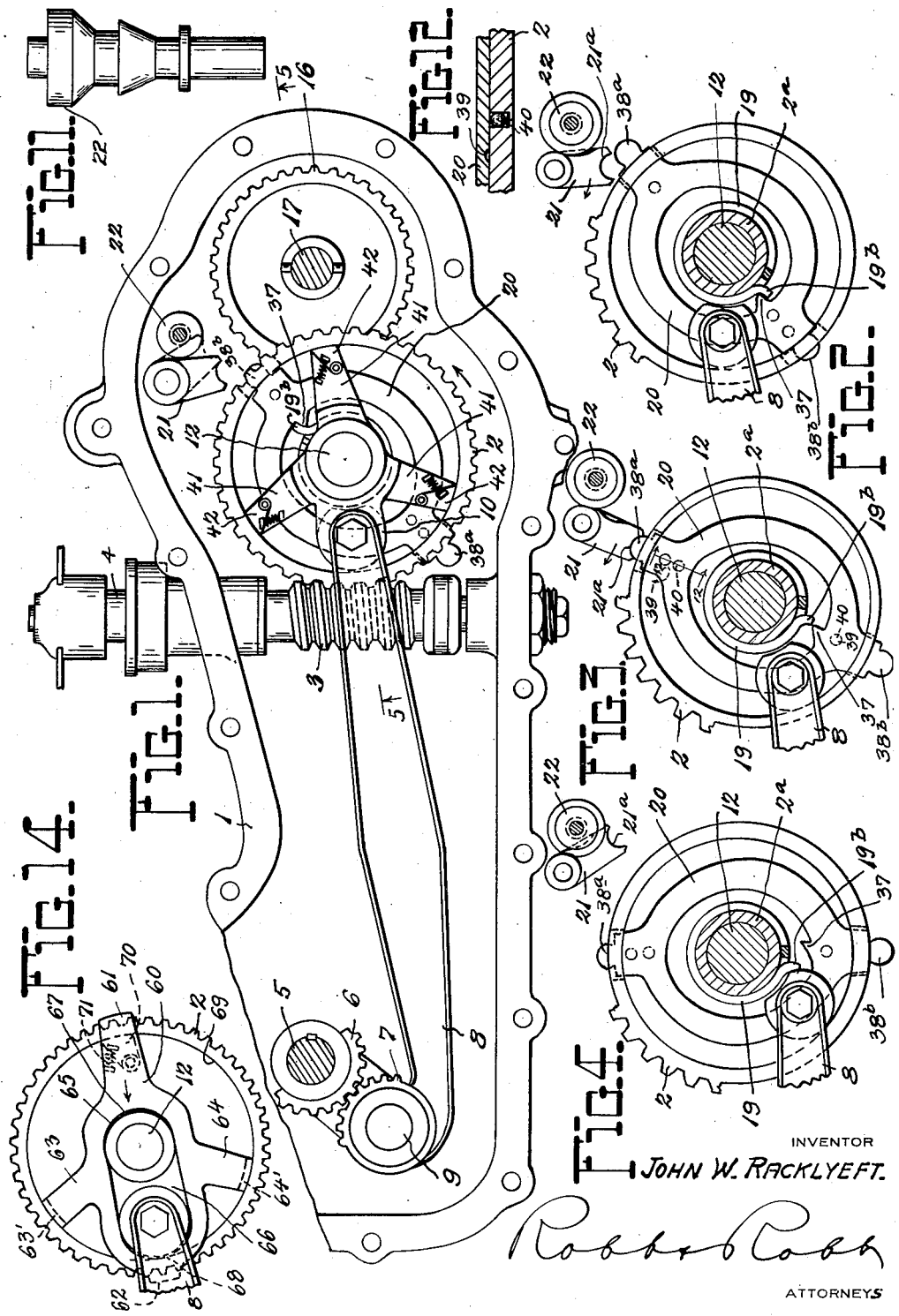

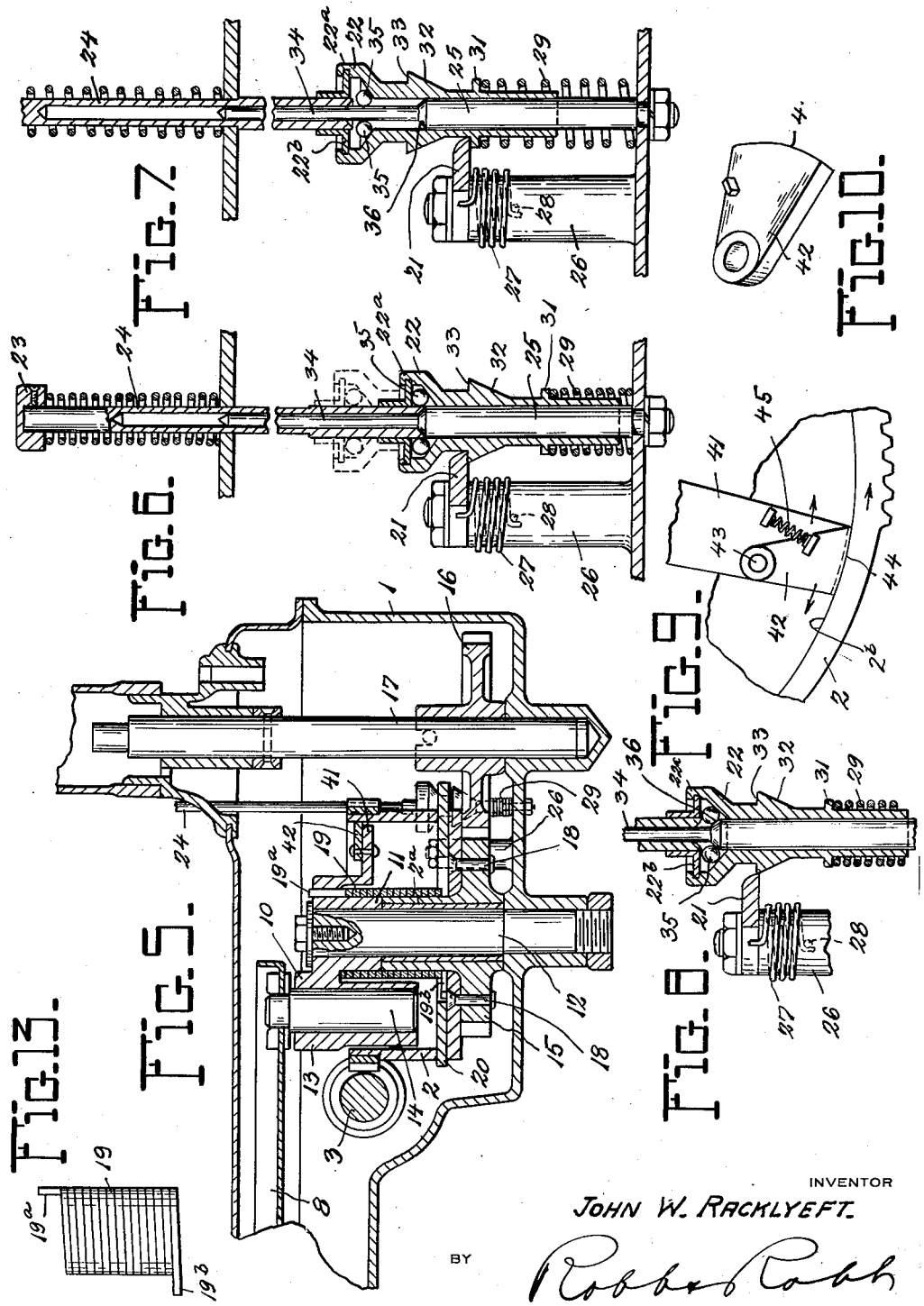

INVENTOR
JOHN W. RACKLYEFT.
BY
ATTORNEYS

Patented May 25, 1937

2,081,838

UNITED STATES PATENT OFFICE 2,081,838

CLUTCH AND CONTROL MECHANISM THEREFOR

John W. Racklyeft, Cleveland, Ohio, assignor to The Apex Electrical Manufacturing Company, Cleveland, Ohio, a corporation of Ohio Application February 18, 1935, Serial No. 7,123

6 Claims. (Cl. 192—43)

The present invention relates to novel improvements in clutches, and particularly to clutches of the type wherein a coil spring is subjected to contractile force for obtaining a clutching effect thereof between driving and driven parts, as described in my copending application, Serial No. 735,041, filed July 13, 1934, Patent Number 2,053,580 granted Sept. 8, 1936, of which this case is a continuation, in part.

Clutch means of the type above referred to are well adapted for use in connection with an actuated part, as for instance an agitator constantly driven in one direction. Where, however, such spring clutch means are to be employed in conjunction with an oppositely moving or oscillated actuating part, for example, in the case of an oscillating agitator of a washing machine or the like, a problem is met incident to the reversal of movement of the actuated part. This problem involves the tendency of the inertia of the water or other material agitated or moved, to act upon the actuated parts with a force that may transfer and momentarily release the clutch spring incident to the overriding effect of the actuated part in relation to the driving gear or driving member.

The continued periodical engagement and disengagement of the spring clutch, which will be a direct result of the said overriding action of the actuated part with respect to the driving member, will obviously shorten the life of the clutch spring because the continuous wrapping and unwrapping action of the clutch spring will finally result in breaking of the same. The continued clutching and unclutching action, which is a direct result of the overriding action and which may be only partial, will also produce increased wear on the moving parts of an agitator mechanism, in conjunction with which a spring clutch of the type above referred to is used.

Another disadvantage resulting from the overriding action described above is that a quiet operation of the clutching means cannot be obtained, as the continuous wrapping and unwrapping of the clutch spring upon the driving part with which it cooperates will produce a continuous clicking noise which will be more or less distinct, depending upon the speed of the agitator and the tensile strength of the spring.

It is therefore the object of the present invention to eliminate the disadvantages set forth herein by employment of an override clutch or lock intermediate the driving and driven members, as will be more fully set forth hereinafter.

Another object of the present invention is to provide an override control of utmost simplicity which may be cheaply manufactured and incorporated within the spring clutch and agitator mechanism without increasing the size of the latter.

A further object of the present invention is the provision of an automatic overriding control which will be rendered operative for preventing an overriding action between the driving and driven members instantaneously upon initiation of the same.

Other and further objects and advantages of the invention will be hereinafter set forth and the novel features thereof defined by the appended claims.

In the accompanying drawings:—

Figure 1 is a plan view, partly in section, of motor driven operating mechanism such as capable of use in conjunction with oscillating type washing machines in which the agitator oscillates or moves back and forth in the washing chamber or compartment, my control and other novel mechanism being applied thereto.

Figure 2 is a fragmentary somewhat diagrammatic view illustrating certain control trip and clutch actuating shuttle parts in conjunction with the driving gear, these parts forming essential features of my present improvements and disposed in the position assumed thereby after actuation of the control handle and just preliminary to disengagement or release of the clutch for discontinuing the operation of the actuated part or agitator.

Figure 3 is a view similar to Figure 2 illustrating the manner in which the trip arm engages the shuttle or clutch engaging and release member to shift said member for the release of the clutch.

Figure 4 is a view similar to the previous two figures described, the clutch spring wholly released.

Figure 5 is a vertical sectional view taken about on the line 5—5 of Figure 1 and bringing out more clearly the disposition of the clutch spring around the hub of the crank which operates the oscillating sector lever, said crank constituting an actuated part or member of the mechanism; also illustrating certain parts of the control device or means and the arrangement of the shuttle or clutch engaging or release member.

Figure 6 is a fragmentary vertical sectional view showing more particularly the control mechanism with the trip sleeve in its down or actuated position as shown in full lines and in its normal unoperated position in dotted lines, the arrangement of parts being such as to cause adjustment of the parts as illustrated in Figure 2 to bring the trip arm for the shuttle plate in position to engage said plate for actuation thereof.

Figure 7 is a view similar to Figure 6 but showing the parts in their normal positions preliminary to the depression or downward actuation of the handle of the control device, said handle being disposed in interlocked relation to the trip sleeve ready to actuate the latter.

Figure 8 is a view similar to Figure 6 but showing certain of the parts of Figure 6 in the positions assumed thereby just before the trip sleeve of the control device reaches its lower position in which it is inter-engaged by the shuttle trip arm.

Figure 9 is a fragmentary enlarged view showing one of the spider arms of the actuated member or crank with the override lock feature intermediate said arm and the driving gear.

Figure 10 is a detail perspective view of the lock dog or wedge of the override lock.

Figure 11 is a side view more clearly showing the trip sleeve of the control device.

Figure 12 is a fragmentary sectional view taken on line 12—12 of Figure 3 showing more clearly the detent parts intermediate the drive gear and the shuttle or clutch engaging and release member.

Figure 13 is a detail view of the clutch spring.

Figure 14 illustrates a modified form of override preventing mechanism.

Figure 15:
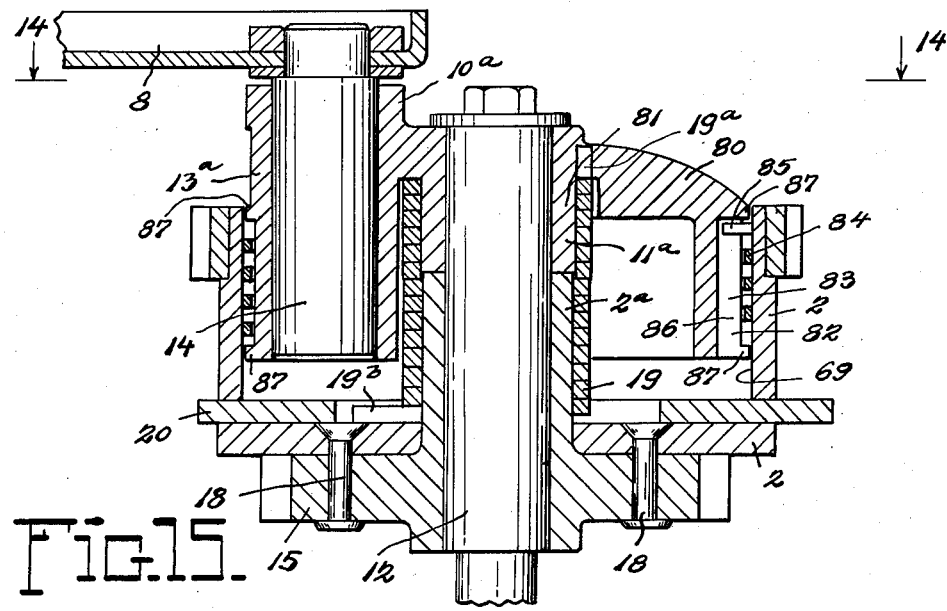

Figure 15 is a sectional view showing a modified construction of overriding control.

Figure 16:
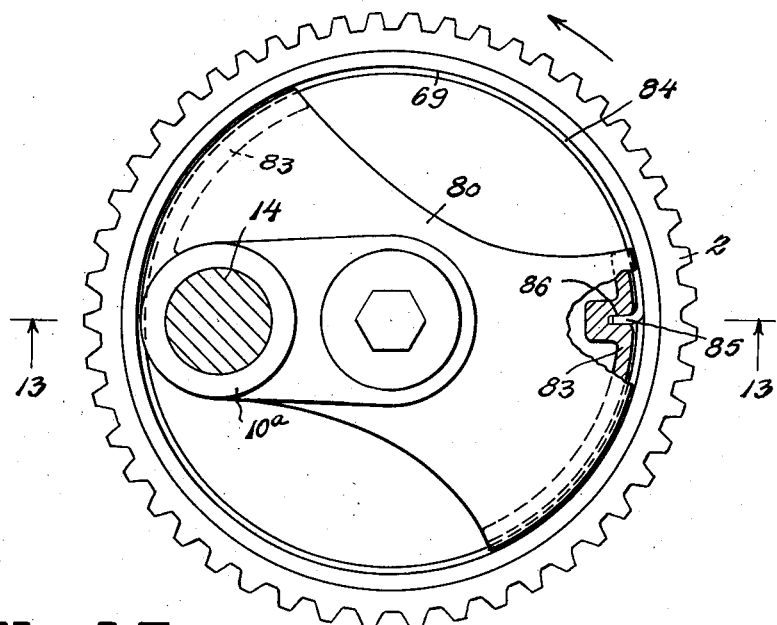

Figure 16 is a top view of Figure 15, parts being omitted.

While my invention has been illustrated as applicable to an agitating type of operating mechanism for washing machines, it is to be borne in mind that the usefulness of the invention is not limited to this particular application, for it may be employed in many places and for many different kinds of machines where a positive clutch is required that will be quick-acting under the influence of the control device therefor, and wherein the control device is of an especially flexible nature so as to effectively and quickly cause the engagement and disengagement of the clutch means in a fool-proof manner so that there is not liable to be any difficulty of operation experienced by reason of the fact that the operator is unskilled and might therefore tend to maintain the control device under pressure an undue length of time, which in the case of the present mechanism will have no ill effect upon the proper operation of the clutch mechanism.

With the foregoing therefore in mind, and referring to Figures 1 to 5 primarily, there is illustrated a portion of the gear or driving mechanism housing of a typical machine, same designated at 1 and enclosing therein the driving member 2 in the form of a gear which is a worm gear which is operated by the worm 3 carried by the motor driven shaft 4 mounted suitably in bearings in the said housing. While the motor driven shaft 4 is in operation the driving member or gear 2 will continuously rotate in one direction, that of the arrow applied to Figure 1. There is shown also a driven agitator shaft 5 having a sector 6, the teeth of which mesh with those of a sector 7 on an oscillating driven lever 8 having the axis 9. These latter parts may be conventional and are illustrative of a common mechanism used for operating agitating mechanism of washing machines.

The driven lever 8 is actuated by means of a suitable crank 10, the hub of which is designated 11, and is rotative upon the stub shaft or axis member 12 suitably mounted in the housing 1 and forming the stationary axis also for the driving member or gear 2 previously mentioned. The driving gear 2 is of somewhat unique structure in that it comprises a hollow body affording a free space for a long vertical bearing 13 carried by the crank or driven member 10, said long bearing receiving the driven pin 14 by which the crank 10 is connected with the oscillating lever 8 at the free end of the latter. The hub of the hollow driving member or gear 2 is designated 2a and receives the axis member or shaft 12 as seen best in Figure 5, the said hub 2a and the hub 11 of the driven member or crank 10 being co-axial with their outer surfaces substantially in alignment. The hub 2a, according to the strict showing of the drawings in Figure 5, is an integral hub on a transmitting gear 15 which is riveted or otherwise rigidly attached to the lowermost portion of the driving gear 2, said gear 15 meshing with a second transmission gear 16 on the driving shaft 17 for a suitable wringer mechanism according to the simple application of the invention as illustrated, though the gears 15 and 16 and shaft 17 are not material features of the present invention whatsoever and could be dispensed with, in which event the hub 2a would be integral with the gear 2 instead of being attached thereto by the fastening means 18.

We now come to the clutch feature of the present invention, the same comprising the clutch spring 19 having the dead end 19a interlocked or engaged with the crank 10 by extending into a vertical opening near the hub portion of the crank, the live end of said spring being designated 19b and the body of the spring being coiled about the hub 11 of the crank 10 and the hub member 2a of the driving gear 2. The spring clutch member 19 may be characterized as normally free in reference to the hub 2a when this clutch member is inactive or the clutch thrown out, so to speak. The action required to obtain a clutching of the parts 11 and 2a together involves the application of contractile or torsional tightening movements of the spring 19 about the hub 2a by rotation of part 20. When the spring clutch member 19 is tightened about the hub 2a the hub 11 of the crank 10 will be clutched to the driving member 2 and its cooperating part 2a so that the driving forces of the member 2 may be transmitted to the crank 10 and to those parts which are driven by said crank.

For the operation of the clutch spring in engaging and releasing the same relative to the hub 2a, there are utilized an engaging and releasing member in the form of a sliding shuttle 20, certain trip mechanism including a trip arm 21 and a trip sleeve 22, or trip arm actuating part, the latter two parts forming members of a control mechanism that includes the downwardly movable handle 23 including the hollow stem 24 cooperative with the trip sleeve 22 and with a spindle 25 which carries the trip sleeve, as will shortly be more fully described.

The trip arm 21 is rotatively mounted at the upper portion of a post 26 around which is disposed a coil spring 27, one end of which is dead-ended on the post 26 by a pin 28, whilst the upper end of the spring 27 is engaged with the arm 21 so as to normally tend to shift said arm 21 in a contra-clockwise direction and maintain said arm cooperatively engaged with the trip sleeve 22. The trip sleeve 22 which is vertically slidable upon the spindle 25 is normally upraised or pushed upwardly by means of a spring 29 that encircles the lower end of the spindle 25 and the lower portion of the sleeve 22, said spring 29 being interposed between the housing 1 and a collar 31 fixed to the lower portion of said sleeve 22. The expansion force of the spring 29 engaging the collar 31 causes the upward push on the sleeve 22 to tend normally to hold it in the position of Figure 7. Collar 31 may be integral with sleeve 22.

The sleeve 22 is provided with a conical shoulder 32, the tapering portion of which is adapted to slide in engagement with a side of the trip arm 21 as shown in Figures 6 and 7 and also Figures 2 to 4, the upper end of said shoulder 32 providing an abutment 33 on top of which the arm 21 may engage under certain conditions as shown in Figure 6. At its upper end the spindle 25 is provided with a reduced portion 34 upon which the stem 24 of the handle 23 is directly mounted and slides. At its upper end the sleeve 22 is cup-shaped as shown at 22a to provide a hollow portion closed by a suitable part 22b, and this cup-shaped portion 22a in conjunction with balls 35 disposed therein provides what may be called a ball clutch intermediate the sleeve 22 and the handle 23. The lower end of the stem 24 of the handle 23 is capable of engaging on top of the balls 35 and when so engaged the downward moving force of the stem 24 of the handle 23 may be communicated to the sleeve 22 until such time as the balls 35 reach the shoulder 36 that forms the juncture between the reduced portion 34 and the body of the spindle 25. When the balls 35 abut with the said shoulder 36 which is a downwardly inclined or tapering shoulder as seen in the drawings, the balls are forced outwardly by said shoulder after the manner illustrated in Figure 6 in full and dotted lines, and the downward moving force of the handle is thus discontinued in reference to the sleeve 22. In other words, this action of the parts 24 and 35 might be described as an unclutching of the handle from the sleeve 22 when the balls 35 reach the shoulder 36 so that not only the downward moving force of the handle is discontinued in reference to the sleeve 22, but the holding action of the downward push of the handle in reference to maintaining the sleeve 22 at its downward limit of movement is likewise rendered inactive or discontinued.

Reverting now to the clutch engaging and disengaging device comprising the shuttle member or plate 20 seen best in Figures 2 to 5 inclusive, it is notable that this shuttle member is of yoke-like construction in that it spans or straddles the hub 2a, and it is located also in the plane of the lower live end 19b of the clutch spring 19. As a support for the shuttle member 20, it is notable that said member rests upon the lower or bottom portion of the hollow driving gear 2 and is horizontally slidable relatively thereto, or radially slidable in reference to the axis 12. On its inner periphery the shuttle member 20 is equipped with an engaging lug or member 37 adapted to be moved into and out of engagement with the live end 19b of the spring 19. On its outer periphery the shuttle member 20 is equipped with integral extensions 38a and 38b, the free extremities of which are somewhat rounded so as to readily engage in a recess 21a in the free end of the trip arm 21 of the control device or mechanism for cooperation in a manner shortly to be set forth.

It is desirable that the shuttle member 20 be held in positions in which its projection 37 is engaged with the live end 19b of the spring 19, and disengaged therefrom by some more or less positive means. For this purpose, as seen in Figures 3 and 12, the underside of the shuttle member 20 is provided with ball depressions 39, and the driving member 2 at its bottom portion is provided with a spring pressed detent ball 40. Thus when the clutch member 20 is in the position of Figure 2 it is held in such position against accidental displacement by the detent member 40 and similarly when the said member 20 is in the position as shown in Figure 3 it will be likewise held by said detent member 40. However, the detent member 40 is such in its action that it will readily permit of the quick sliding of the shuttle member 20 under an actuating force.

Describing now the operation of my clutch mechanism of the construction set forth, reference is made first to Figure 2 wherein the clutch spring 19 is shown as engaged by the shuttle member 20 on the driving gear 2 so that the rotative driving force of the gear acts upon the live end 19b of the clutch spring and the driving forces are transmitted from the driving member 2 to the driven member or crank 10. The action of said driving forces when the parts are in the position of Figure 2 is of course to contract the clutch spring 19 about the hub 2a as previously set forth.

Assuming now that it is desired to unclutch the driving member 2 from the driven member or crank 10 to stop the operation of the latter with the clutch parts in the position of Figure 2, the handle 23 is depressed as shown in Figure 6 until the ball clutch parts 35 are disengaged from the stem 24. Shortly before this disengagement takes place, the cone portion 32 of the trip sleeve 22 engages the trip arm 21 of the control device after the manner illustrated in Figure 8, and upon the final downward movement of the sleeve 22 said arm 21 will engage over the shoulder 33 previously described. The engaging action of the cone portion 32 of the sleeve 22 with the arm 21 shifts the arm 21 laterally in the direction of the arrow in Figure 2 so that the arm 21 will engage by its recess 21a with one of the extension parts 38a and 38b of the shuttle member 20, thereby to cause sliding of the shuttle member 20 to disengage its projection 37 from the clutch spring 19 at the live end 19b of the latter, permitting release action of the clutch and discontinuance of the drive from the drive member 2 to the driven member or crank 10. It was noted that before one of the extensions 38a—38b of the shuttle member 20 engages the arm 21, the arm 21 acts as a detent to temporarily lock the trip sleeve 22 in the position as shown in Figure 6. Thereafter, of course, the arm 21, being engaged by one of the extensions 38a—38b of the shuttle member 20 and shifted in the direction of the arrow in Figure 2, is carried away from the trip sleeve 22, and the latter is free at such time to quickly rise under the action of the expansion spring 29 to assume the dotted line position of Figure 6 or the full line position of Figure 7. This action is accomplished whether the person operating the control handle 23 lets go of said handle immediately after depressing the same for the control operation of releasing the clutch, or whether such person maintains the handle under downward pressure after the initial depression thereof. The action of the trip sleeve 22, therefore, now being automatically released from the pressure control of the handle 23, is important in preventing a re-engagement of the clutch after release thereof by the depression of the handle which would happen if the automatic release of the trip sleeve 22 were not obtained in the manner above set forth.

Figure 3 shows how the trip arm 21 by its abutment cooperation with the shuttle member 20 disengages the shuttle member from the live end of the spring 19, said arm 21 being of course pushed by the shuttle member 20 further in the direction of the arrow in Figure 3 until the extension part 38a disengages from the recess 21a of part 21, whereupon the spring 27, see Figures 6 and 7, restores the trip arm 21 to its position as shown in Figure 4 and in Figure 7, where it is ready to be engaged later by the cone portion 32 of the trip sleeve 22 upon a subsequent depression of the handle 23.

The clutch means has now been fully released, and in order to engage the clutch again, the previous cycle is gone through, except that the member 38b will this time be actuated by the trip arm 21 for shifting movement of the shuttle member 20 in an opposite direction to that illustrated as taking place in Figure 3, under which conditions the projection 37 of the shuttle member 20 will be re-engaged with the live end 19b of the clutch spring, whereby the clutch is thrown in, a reverse action, of course, to that described at the outstart of setting forth the operation of the parts.

In other words, when the clutch is thrown in as shown in Figure 2, the extension member 38a projects from the driving member 2 a greater distance than the extension member 38b so that the member 38a is the only one active in reference to the trip arm 21 at such time. When, however, the clutch is thrown out as shown in Figure 4, the extension member 38b is the only part available on the shuttle member 20 for engaging with the trip arm 21 to enable throwing in of the clutch after the same has been released. The clutch mechanism as before described is suitable for clutching drive and driven parts generally. In respect, however, to constructions wherein the driven parts involve oscillating members such as 5, 6, 7, and 8, of an oscillating agitator of a washing machine, the action of the driven part in conjunction with a spring clutch involves the problem of dealing with movement of the driven part additional to that which is compelled by the driving forces of the drive part, and which may tend to somewhat release the clutch action of the clutch spring which depends for its effectiveness upon the load being maintained on the live end of the spring to effect contraction thereof. This additional movement as explained above is usually termed "overriding" in this art.

In order to meet the above problem, I show in Figures 1, 5, 9, and 10 certain special parts which I preferably employ for such purpose. These include a spider comprising one or more diverging arms 41 integral with and extending radially from the crank hub 11. Each of said arms 41 is equipped with an override lock member 42 in the form of a segmental plate or arm pivoted at 43 and provided with a wedge or cam engaging surface 44 eccentric to the concentric hollow body of the driving gear 2. Normally when the hub 11 is clutched to the hub portion 2a of the driving member 2, the arm or arms 41 of course travel in the same direction as the driving member 2 and at the same speed. Therefore, during the driving operation when the clutch spring 19 is in clutched engagement, the parts 41, 11, and 10 as driven members operate in unison and substantially as one with the driving member 2, being stationary relatively to each other.

To explain the overriding action mentioned above more fully, attention is called to the fact that the speed of the oscillatory movement of the pitman varies according to the position of the crank 10 with respect to the same. Assuming that the parts 10 and 8 are in a position as shown in Figure 1 and the gear 2 is rotated in a direction as indicated by the arrow in this figure, it will be noted that the crank 10 and pitman 8 are in a dead-center position at which the motion of the pitman 8 is zero. If rotation of the crank 10 is now continued in the direction of the arrow as indicated above, the oscillatory movement of the pitman 8 changes from zero to its maximum speed, which maximum speed will be reached when the crank has traveled through an arc of 90° with respect to the previously assumed position, and upon continuation of the rotation of the crank, the speed of the pitman will now slow down and reach another zero position, which is the other dead-center position opposite to the dead-center position mentioned before. Further continuation from this latter dead-center position will again increase the oscillatory movement of the pitman from zero to its maximum speed, which will be reached at the end of the movement of the crank 10 through an arc of 90° with respect to the latter dead-center position. After the crank has passed this position the speed of the pitman will again slow down from maximum to zero and the parts described in the foregoing have now completed a full cycle of rotation and oscillation and are again in the position shown in Figure 1. Every time, during the cycle of operation, that the speed of the pitman 8 is reduced from maximum to zero, there is a tendency of the pitman to maintain its maximum speed and to force the crank 10 somewhat ahead with respect to the gear 2 due to the inertia of rotation of the water in the tub, and the overriding action mentioned previously herein takes place. This overriding action tends to somewhat release the clutch spring 19 because in order for such clutch spring to be effective in its clutching action it must be under load with its dead-end relatively stationary and its live end contracted under torsional tension.

To eliminate the possibility of the overriding or advancing movement of the crank 10 and its hub 11 relatively to the driving member 2 as set forth, I provide the override lock member 42 previously mentioned. The eccentric surface 44 of said lock member 42 is normally held in slight frictional contact with the inner surface 2b of the member 2 by the spring 45 as depicted substantially in Figure 9. Under such conditions the member 42 does not in any way influence the normal cooperation of the parts 41, 11, and 10 and the driving member 2, as long as these parts are operating in unison or are relatively stationary respecting each other. However, should the parts 10, 11, and 41 have the tendency to override while moving in the same direction of rotation as the driving member 2, the lock 42 comes into play immediately with its eccentric surface 44 to prevent such overriding movement. Of course, the foregoing deals with the condition of active clutching adjustment of the clutch spring 19. When the clutch action is thrown out and the driven parts 10, 11, 41 are stationary on account of the inaction of the clutch whilst the driving member 2 is rotated, the lock member 42 simply slides into light surface frictional contact at its portion 44 with the surface 2b of the driving member 2, thus permitting independent movement of these parts. The action of the override lock member 42 is effective only when the crank 10 and the driving member 2 are clutched together. It is noted that the extension members 38a and 38b extend through openings in the wall that forms a portion of the hollow body of the driving member 2 and are slidable radially in such openings.

Obviously, without the separately acting part 22, the handle 23, if depressed and immediately released, might not shift the arm 21 to move the shuttle 20, if the parts 38a or 38b had just passed the arm 21. The cone detent 32 therefore is required so that the part 22 may always be held down long enough to make sure the arm 21 will remain in the path of movement of one of the extensions 38a and 38b a period of time sufficient that the shuttle will be tripped, whereupon the part 22 is automatically released by the tripping action itself after performance thereof. The release of the part 22 will take place as before stated, even though the operator holds the handle 23 depressed longer than necessary, this release being essential to prevent two trip actions of the shuttle that would effect clutching and unclutching (or vice versa) in one cycle of rotation of the driving member 2.

In Figure 14 I have shown another construction of an override lock member which has certain advantages over the override lock member previously described in connection with Figure 1. It should be noted that the override lock mechanism disclosed in Figure 1 causes considerable friction between the crank sleeve 11 and shaft 12 when the locking mechanism is in operation, and to relieve the shaft 12 of any undue friction the arrangement disclosed in Figure 14 has been devised. The override lock mechanism of Figure 14 comprises a plate 60 having arms 61, 62, 63, and 64. The plate 60 is further provided with a cut-out portion at 65 which is of a similar shape to the crank portion 66 but the said cut-out portion or opening 65 is slightly larger than the crank portion 66, as clearly shown at 67 and 68. The arms 61 and 62 rest upon the upper surface of the gear 2 while the arms 63 and 64 are provided with downwardly bent portions 63' and 64' which are adapted to engage the inner surface 69 of the gear 2. The arm 61 is further provided at its under-side with a lock member 70 and spring 71. This lock member 70 is of exactly the same construction as the lock member 42 described previously herein and the operation is likewise the same. It will therefore be noted that the plate 60 is rotated in unison with the crank 66 and as soon as the overriding action of the crank 66 takes place the lock member 70 will lock the plate 60 with respect to the gear 2. When this locking action takes place the plate 60 will move slightly in a direction indicated by an arrow in Figure 14 and the downwardy extending portions 63' and 64' of the arms 63 and 64 will be forced against the inner surface 69 of the gear 2, thereby locking the plate 60 against the gear 2 in a manner which will be quite obvious. The overriding of the crank 66 with respect to the gear 2 is thereby prevented. When the parts are in a locking position as just described, there will still be a slight play between the plate 60 and crank 66 as indicated at 67. The locking force is therefore not transferred upon shaft 12 and no undue friction will be created between the shaft 12 and the crank sleeve 11. In other words the plate 60 is movable with respect to the crank 66, shaft 12, and sleeve 11 and the play between the plate 60 and crank 66 is such that when the locking member 70 is brought into operation and the portions 63' and 64' have engaged the surface 69 of the gear 2 there will be no pressure applied against the shaft 12.

The overriding lock mechanism as disclosed in Figure 14 is of considerable value in connection with small machinery such as washing machines or the like wherein any undue amount of friction has to be eliminated.

In Figures 15 and 16 I have illustrated another modification of an override preventing mechanism wherein the crank 10a comprising a long vertical bearing 13a is a part of a clutch member 80, which comprises the hub portion 11a, a main clutch portion 81, and an auxiliary or override clutch portion 82. The parts 10a, 13a, 11a, and 81 of the clutch member 80 are corresponding to the parts 10, 13, and 11 as previously described. The clutch member 80 comprises, however, the auxiliary or override clutch portions 82 which constitute segmental drum portions 83 which are somewhat spaced from the inner drum surface 69 of the driving member 2 to permit the insertion of a coil spring 84 between the said members. One end of the coil spring 84 is indicated at 85 and is secured to one of the segmental drum portions 83 by inserting the same into a slot 86 in said portion. The other end of the coil spring 84 is free and the spring 84 is arranged between the driving member 2 and the segmental drum portions 83 in such a manner that the same will bear against the surface 69 of the driving member 2 with a slight frictional contact. Extensions 87 on the segmental drum portions will assure that the coil spring 84 is properly held in its position. The structure of the remaining mechanism disclosed in Figures 15 and 16 is the same as previously described, and a repetition is therefore not thought to be necessary. If the spring clutch 19 is brought into clutching engagement, it will be obvious that the clutch member 80, of which the crank 10a is a part, will be rotated in unison with the driving member or gear 2. If an overriding action between the clutch member 80 and the gear 2 takes place in a manner as more fully described hereinbefore, spring 84 which is in frictional contact with the driving gear 2 will have a tendency to unwrap itself against the drum surface 69 of gear 2, and clutch member 80 and crank 10a will become locked with respect to the driving gear 2.

If the main clutch which comprises members 81, 2a, and spring 19, is disengaged and the crank 10a and clutch member 80 stationary, it will be seen that the rotation of the driving member or gear 2 in the direction indicated by an arrow in Figure 16 will have a tendency to wrap the coil spring 84 upon the segmental drum portions 83, and a locking action will therefore not take place as it is now the tendency of the coil spring 84 to move away from the drum surface 69.

The override control clutch mechanism as illustrated in Figures 15 and 16 has the advantage that it is of a very simple construction and that it comprises only a few parts which may be readily assembled.

The operation of the modified structure as shown in the figures above referred to is very effective, and the pressure against the shaft 12 which is present in the override construction as shown in Figure 1 is absolutely eliminated in this arrangement. A further advantage of the construction above referred to is its compact construction which assures proper operation of the parts without any likelihood of breakage during continuous operation.

Having thus described my invention, what I claim as new and desire to secure by Letters Patent of the United States, is—

1. In a clutch mechanism, in combination, a driving member, a driven member, a clutch between said members, releasable incident to an overriding movement of the driven member relatively to the driving member in the direction of movement of the latter, the clutch comprising a spring, and the driving member including an auxiliary clutch surface, and an override preventing means for the driven member rotatable therewith and shiftable relatively thereto comprising a plate having a plurality of arms provided with interlocking means for engaging the auxiliary clutch surface of the driving member upon relative higher movement of the driven member in the direction of movement of the driving member.

2. In a clutch mechanism, in combination, a driving member, a driven member, a clutch between said members releasable incident to an overriding movement of the driven member relatively to the driving member in the direction of movement of the latter, the clutch comprising a spring, and the driving member including an auxiliary clutch surface, an override preventing means for the driven member including an arm movable with the same, and a member movable on said arm and having an eccentric wedging surface to engage said auxiliary clutch surface upon relative higher movement of the driven member in the direction of movement of the driving member.

3. An override clutch of the character described, comprising, in combination, a driving member comprising a clutch surface, a driven member including a segmental drum portion, and a coil spring between said drum portion and clutch surface and in frictional contact with the latter, said drum portion comprising means for interconnecting the same with the coil spring and for expanding the coil spring upon relative higher movement of the driven member with respect to the driving member to thereby clutch the driven member to the driving member.

4. A clutch mechanism of the character described, comprising, in combination, a driving member and a driven member, a main clutch between said members for transmitting rotation of the driving member to the driven member, an auxiliary clutch surface on the driving member, a segmental drum portion on the driven member, and a coil spring between said drum portion and auxiliary clutch surface, and in frictional contact with the latter, said drum portion comprising means for interconnecting the same with the coil spring and for expanding the coil spring upon relative higher movement of the driven member with respect to the driving member to thereby clutch the driven member to the driving member.

5. In a clutch mechanism, in combination, a driving member, a driven member, clutch means intermediate the said two members, a shuttle member mounted upon the driving member and having a part for engaging and releasing the clutch means, a control device including a trip member to engage and actuate said shuttle member for clutch engagement and releasing operations, and auxiliary clutch means between the driving and driven members for preventing overriding movement between the driving and driven members, said clutch means comprising a coil spring connected with the driven member and in frictional contact with the driving member.

6. In a clutch mechanism, in combination, a driving member, a driven member, a clutch between said members releasable incident to an overriding movement of the driven member relatively to the driving member in the direction of movement of the latter, the clutch comprising a spring, and the driving member including an auxiliary clutch surface, an override preventing means for the driven member including an arm movable with the same, and a member movable on said arm and having eccentric wedging means to engage said auxiliary clutch surface upon relative higher movement of the driven member in the direction of movement of the driving member.

JOHN W. RACKLYEFT.